United States Patent [19]
Ishikawa et al.

[11] Patent Number: 6,031,310
[45] Date of Patent: Feb. 29, 2000

[54] SPINDLE MOTOR AND METHOD FOR MANUFACTURING SAME

[75] Inventors: Masayuki Ishikawa; Shinichi Niwa, both of Nagano, Japan

[73] Assignee: Sankyo Seiko Mfg. Co., Ltd., Nagano-ken, Japan

[21] Appl. No.: 09/013,856

[22] Filed: Jan. 27, 1998

[30] Foreign Application Priority Data

May 26, 1997 [JP] Japan ..................................... 9-134599

[51] Int. Cl.[7] ................................................. H02K 21/12
[52] U.S. Cl. ............................ 310/156; 310/45; 156/218
[58] Field of Search ........................... 310/156, 45, 268; 156/218; 29/598

[56] References Cited

U.S. PATENT DOCUMENTS

| | | | |
|---|---|---|---|
| 4,788,464 | 11/1988 | Nashikawa et al. | 310/268 |
| 4,851,731 | 7/1989 | Soatome et al. | 310/258 |
| 4,862,805 | 9/1989 | Suzuki et al. | 428/558 |
| 4,935,080 | 6/1990 | Hassell et al. | 156/154 |
| 5,154,978 | 10/1992 | Nakayama et al. | 428/469 |
| 5,452,156 | 9/1995 | Uda et al. | 360/97.01 |
| 5,488,594 | 1/1996 | Kobayasi et al. | 369/44.14 |
| 5,689,388 | 11/1997 | Oka et al. | 360/99.12 |
| 5,744,881 | 4/1998 | Ishizuka et al. | 310/67 R |

FOREIGN PATENT DOCUMENTS 8-64450   8/1996   Japan .

*Primary Examiner*—Nestor Ramirez
*Assistant Examiner*—Joseph Waks
*Attorney, Agent, or Firm*—McAulay Nissen Goldberg Kiel & Hand, LLP

[57] ABSTRACT

A spindle motor comprises a rotor, which is rotatably supported by a stator, a rotor yoke, which is made up of a magnet fixed onto the rotor and a drive magnet, which is made of a bonded magnet which is adhesively fixed onto the rotor. A first metallic layer is formed onto a surface on the rotor yoke facing the drive magnet. A second metallic layer is formed on a surface of the drive magnet facing the rotor yoke.

8 Claims, 2 Drawing Sheets

SPINDLE MOTOR AND METHOD FOR MANUFACTURING SAME

BACKGROUND OF THE INVENTION a) Field of the Invention

The present invention relates to a spindle motor which rotates a rotor loaded with an object to be rotated (e.g. a hard disk, an optical disk, a rotary polygonal mirror). More specifically, it relates to a technology in which a drive magnet is adhesively fixed onto a rotor yoke.

b) Description of the Related Art

A spindle motor is used to rotate a variety of disks, rotary polygonal mirrors, and many other objects to be rotated. A popular type of this spindle motor rotatably supports a hub, which is a rotor, having a loading surface, to be loaded with an object to be rotated around a fixed shaft. The rotor comprises a rotor yoke, which is made of a magnet, and a drive magnet, which is adhesively fixed onto the rotor yoke. When making a drive magnet of conventional technology with a bonded magnet made of magnetic powder with a binder resin, the surface of the bonded magnet is coated with an epoxy resin, then, is adhesively fixed onto the rotor yoke with an epoxy adhesive.

In conventional technology, an epoxy adhesive is used for bonding a bonded magnet and a rotor yoke for the following reasons:

the same epoxy type adhesive adheres stronger to the epoxy coated surface of the bonded magnet; and an epoxy adhesive can completely cure the magnet coating without presence of a special catalyst, thus preventing out gassing, which may be caused by the adhesive which is still under curing.

However, there is a strong demand for reduction of manufacturing cost of a spindle motor. If epoxy is the only source for an adhesive that can bond a bonded magnet and a rotor yoke as is the case in conventional technology, the time required for curing the epoxy adhesive is too long; this will be a problem in improving productivity.

OBJECT AND SUMMARY OF THE INVENTION

The primary object of the present invention is to improve the surface state of the bonded magnet used for a drive magnet such that any adhesive can bond the bond magnet and a rotor yoke, thus improving productivity in manufacturing a spindle motor.

In accordance with the invention, a spindle motor comprises a rotor, which is rotatably supported by a stator, a rotor yoke, which is made up of a magnet fixed onto the rotor and a drive magnet, which is made of a bonded magnet which is adhesively fixed onto the rotor. A first metallic layer is formed onto a surface on the rotor yoke facing the drive magnet. A second metallic layer is formed on a surface of the drive magnet facing the rotor yoke.

DESCRIPTION OF THE PREFERRED EMBODIMENTS

Embodiment 1 is described with reference to the drawings.

Figure 1:
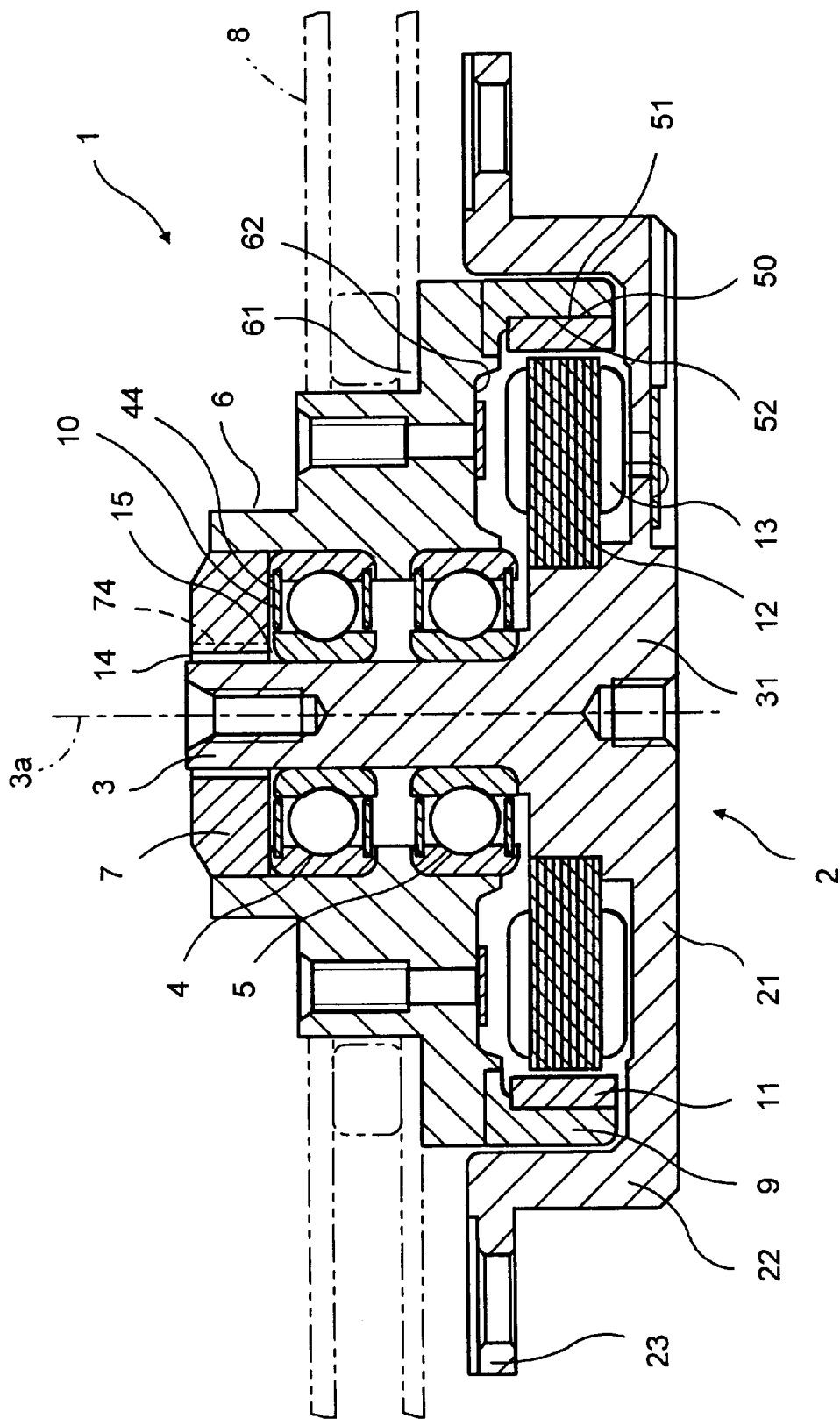
FIG. 1 is a simplified cross section of a spindle motor used for a hard disk drive of the present invention.

FIG. 1 shows spindle motor 1 for a hard disk drive to which the present invention is applied. Element 2 is a motor frame. Fixed shaft 3 vertically stands in the center of the disk shaped bottom wall 21 of motor frame 2. A large diameter stator core mounting portion 31 is formed at the bottom end of fixed shaft 3. Concentrically cylindrical hub (rotor) 6 is rotatably supported by fixed shaft 3 via ball bearings 4, 5 along the outer circumference. Annular seal member 7 is arranged between the tip portion of fixed shaft 3 and the tip portion of hub 6, forming minute gap 14, as shown in FIG. 1, sealing the gap between fixed shaft 3 and hub 6. Stepped surface 61 is formed on the outer circumference of hub 6. Stepped surface 61 is the loading surface of hard disk 8, as indicated with a two dotted line in the figure.

Annular rotor yoke 9 is fixed onto the edge 62 of the lower side of hub 6. Drive magnet 11 is adhesively fixed onto the inner surface of rotor yoke 9 as described later. Stator core 12 is installed around stator core mounting portion 31 of fixed shaft 3. A plurality of projections are formed at a predetermined distance on the outer side in the radius direction of stator core 12; drive coil 13 is wound around each of the salient-poles. The outer circumference of each of the salient-poles is arranged opposite drive magnet 11. As is well known, hub 6, on which drive magnet 11 is fixed, rotates around fixed shaft 3 by switching on/off each of the drive coils 13. In this way, hard disk 8 loaded on hub 6 can be rotated.

Circumference wall 22 of motor frame 2 is formed such that it surrounds the outer circumference of rotor yoke 9. Annular flange 23, extends toward the outside in the radius direction of rotation shaft line 3a on the upper end of outer circumference wall 22. Annular flange 23 is fixed onto a hard disk drive body (not illustrated).

Annular seal 7 is sealingly fixed onto the inner circumference of hub 6 such that it rotates together with hub 6. The inner circumference of annular seal member 7 is arranged opposite on the outer circumference of fixed shaft 3. The annular edge (lower side in the figure) of annular seal member 7 is arranged opposite ball bearing 4. Ball bearing 4 comprises:

inner ring fitted into the outer circumference of fixed shaft 3;

outer ring fixed onto the inner circumference of hub 6; and balls which are rollingly inserted between them.

Also in this embodiment, the gap between the inner ring and the outer ring is substantially sealed by annular seal plate 44, excluding minute gap 5 (described later) at the opposite side of annular seal member 7.

The upper edge of the outer ring, at which the outer ring is fixed onto hub 6, is sealingly fixed onto the edge of annular seal member 7. However, the upper edge of the inner ring, which is fixed onto fixed shaft 3, is arranged opposite the edge of annular seal member 7 over minute gap 10. In this way, the parts fixed onto the fixed shaft 3 side and the parts fixed onto hub 6, the rotary side, are not tied, providing a gap through which air can pass. We paid attention to the role of the gap through which air flows from ball bearing 4 to the outside the motor and configured a motor with a labyrinth seal structure, which is created by varying the size of the gap. In other words, we set the gap 15 between the edge of the inner ring of the ball bearing 4 and the annular edge of annular sealing member 7 to about 30 to 50 μm. On the other hand, we set the gap 14 between the outer circumference surface of fixed shaft 3 and the inner circumference of annular sealing member 7 to about 20 μm. Also in this embodiment, each of the members which define these gaps is made of a material having almost the same thermal expansion coefficient so that the change in temperature will not deviate the size of the gaps. Oil mists or dusts, which tend to flow to the outside, will be sealed in the labyrinth seal constructed with gaps 14, 15 of different sizes, preventing oil mists and dusts from contaminating the outside. In addition, as a countermeasure for the case in which oil mists and the like are not completely sealed in the labyrinth seal structure flowing toward the outside of the motor, a plurality of grooves 74 are formed on the inner circumference of annular seal member 7 in this embodiment. In this way, when annular seal member 7 rotates as the motor rotates, grooves 74 generate an air flow, which cancels the air flow generated by gaps 15, 14.

How rotor yoke 9 and drive magnet 11 are bonded is described with reference to FIG. 2 in addition to FIG. 1.

Figure 2:
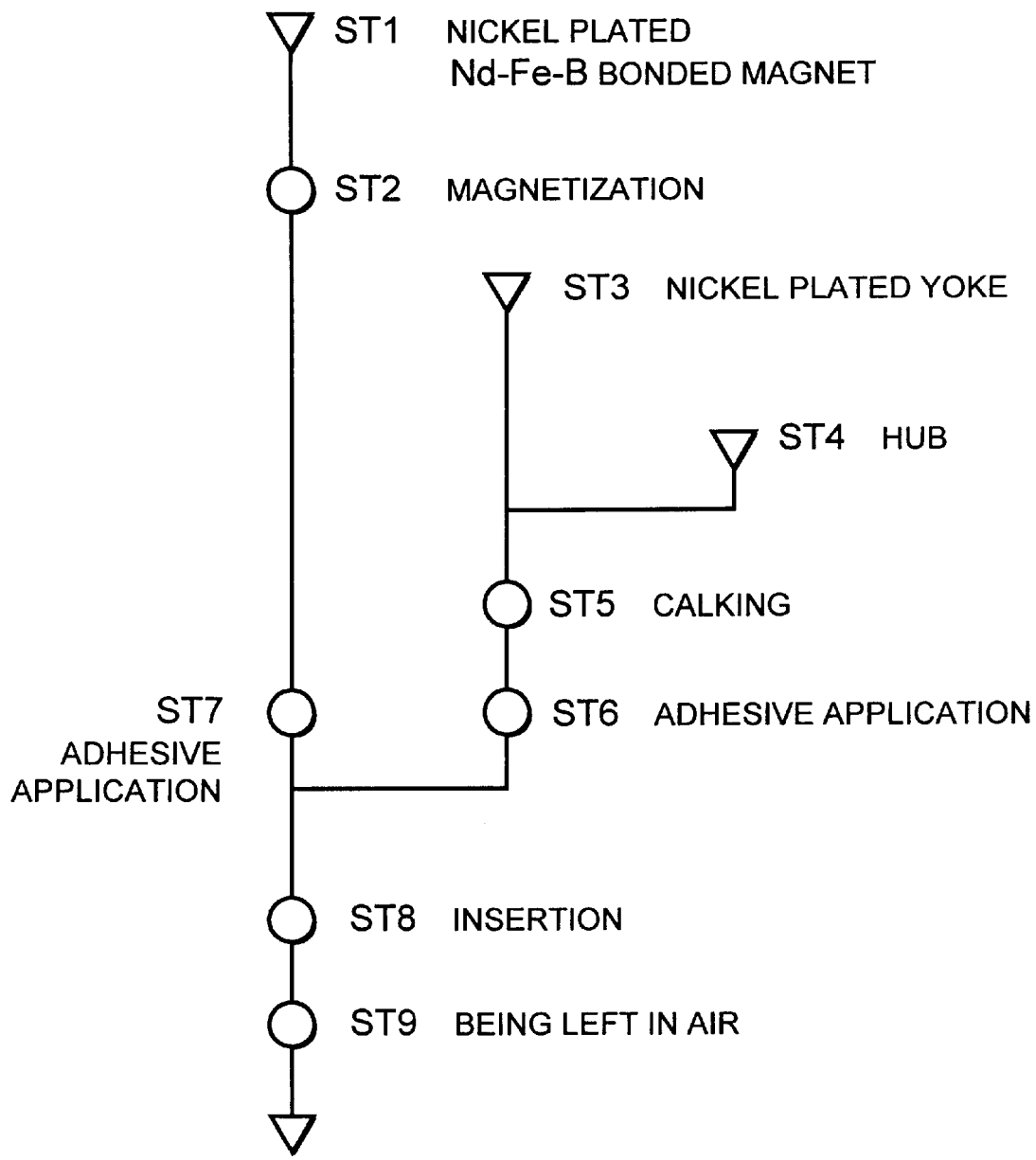
FIG. 2 is a flow chart showing steps, in the manufacturing method of the spindle motor shown in FIG. 1, for bonding a rotor yoke and a drive magnet.

FIG. 2 is a descriptive diagram showing the process flow in which rotor yoke 9 and drive magnet 11 are bonded.

As shown in FIGS. 1 and 2, drive magnet 11 is made of a bonded magnet made of a rare earth by molding a magnet powder such as Nd-Fe-B system with a binder resin. This bonded magnet made of a rare earth can be manufactured by many different methods. For example, as disclosed in Japanese patent laid open No. H8-64450, it can be manufactured by the following steps:

mixing a binder resin, which is made by mixing:
　a rare earth,
　a coupling agent (e.g. silane system),
　an epoxy resin, and
　a liquid acrylonitrile - tolylbutadiene rubber;
rolling;
grinding; then
compression molding, and
heat curing.

The process steps also include:

plating a second metallic layer, which is electrolessly nickel plated layer 52, on the entire surface of the finished drive magnet 11 (ST 1), and magnetization (ST 2).

On the other hand, rotor yoke 9 is made by a magnetic powder material which is compression molded or by a pressed magnetic plate. Regardless of the make, it is to the entire surface of rotor yoke 9 that a first electrolytically nickel plated layer 51 (ST 3) is plated.

Rotor yoke 9, which is plated with electrolytically nickel plated layer 51, is formed in a predetermined shape (ST 4), then, is calkingly fixed onto hub 6. (ST 5.)

Then, the step goes to bonding of drive magnet 11 onto rotor yoke 9 using an adhesive.

In the above bonding step of this embodiment, first, a primer coating is performed. In this step, solvent containing metallic ions (e.g. copper ions) is applied onto the surface of electrolessly nickel coated layer 52 on drive magnet 11 and on the surface of electrolytically nickel coated layer 51 on rotor yoke 9. Next, acrylic adhesive 50 is applied to the inner circumference of rotor yoke 9 and the outer circumference of drive magnet 11. (ST 6, 7). Drive magnet 11 is, then, inserted inside of rotor yoke 9 (ST 8).

Acrylic adhesive 50 can be made of a material whose main ingredient is:

methacrylic acid ester
　(Trade name: Three Bond 1355; Manufacturer: Three Bond Kabushiki Kaisha); or a mixture of urethane acrylate prepolymer and acrylic monomer
　(Trade name: Chemiseal 4Y823N; Manufacturer: Chemitech Kabushiki Kaisha.)

Acrylic adhesive 50 is, then, left under normal temperature for a predetermined time for curing to fix drive magnet 11 onto inner rotor yoke 9. (ST 9.)

Acrylic adhesive 50 is anaerobic and cures if left under normal temperature and it cures faster than epoxy adhesive. However, it has not be used for bonding a rotor yoke 9 and drive magnet 11 because it was believed that the adhesive was not suitable for bonding a resin and a metal.

Acrylic adhesive 50 can be used in this embodiment because drive magnet 11 is bonded with rotor yoke 9 via electrolessly nickel plated layer 52 formed on the surface of drive magnet 11 and electrolytically nickel plated layer 51 formed on rotor yoke 9. Therefore, in this embodiment, even if acrylic adhesive 50 is not completely cured but as long as it is cured to the level at which drive magnet 11 does not fall off from rotor yoke 9, spindle motor 1 can be assembled while acrylic adhesive 50 is completely cured. In this way, the time required for bonding drive magnet 11 with rotor yoke 9 can be substantially reduced, thus increasing productivity and reducing manufacturing cost.

Also, even if acrylic adhesive 50 is not completely cured at the point when spindle motor 1 completes the manufacturing steps, it will be completely cured at least before it is actually assembled into a hard disk (data storage disk) drive system. Therefore, the present invention has an advantageous effect in that uncured acrylic adhesive 50 will not out gas after a hard disk (data storage disk) is assembled into a hard disk drive system. In addition, the fact that drive magnet 11 is coated with electrolessly nickel plated layer 52 prevents the magnetic powder, of which drive magnet 11 is made, from falling off. For this reason, spindle motor 1 of the present invention can provide high productivity. Also, it does not out gas or generate magnetic powder dusts, thus makes the manufacturing method suitable for making a hard disk drive system which requires stringent specifications, that reduces manufacturing cost, and that keeps the system free from out gassing or dust contamination.

Also, in this embodiment, the surfaces of drive magnet 11 and rotor yoke 9 are the same. The only difference is the fact that one surface is electrolessly plated and the other is electrolytically plated. For this reason, acrylic adhesive 50 is provided a catalytic reaction of the same level by the two nickel layers, of drive magnet 11 and of rotor yoke 9, during curing. As described, acrylic adhesive 50 is not exposed to an unnatural force, preventing drive magnet 11 (bonded magnet) from distortion. Therefore, drive magnet 11 can be truly circular, thus preventing spindle motor 1 from abnormal spinning.

In the above embodiment, the same metallic material (nickel plated layer) is formed on both drive magnet 11 and rotor yoke 9. However, viewing from increased productivity and prevention of out gassing, different metallic materials may be used for drive magnet 11 and rotor yoke 9. The type of metallic material is not limited to these but zinc layer or aluminum layer, for example, may be formed on the surfaces of drive magnet 11 and rotor yoke 9. In addition, the method of forming these layers is not limited to plating; a dry processing such as chemical vapor deposition may also be used. Also, instead of forming a metallic layer on the entire surfaces of drive magnet 11 and rotor yoke 9, it can be formed only on the surfaces facing each other; this also increases productivity and prevention of out gassing. Another effect of forming a metallic layer on both drive magnet 11 and rotor yoke 9 is that drive magnet 11 can be press fitted into rotor yoke 9 or drive magnet 11 can be shrink fitted onto rotor yoke 9.

Another effect is that the presence of the layers eliminates the limitation in selecting the type of adhesive for bonding drive magnet 11 and rotor yoke 9, making it possible to use any adhesive including the epoxy resin adhesive used in conventional technology.

In addition, the above mentioned spindle motor 1 is an example of a motor used for a hard disk drive system. This invention can also be applied to a variety of motors used for driving a rotor to be rotated (e.g. laser beam printer motor).

Also, the above mentioned spindle motor 1 is of a structure in which hub 6 is supported with an open side by a ball bearing at the tip side of fixed shaft 3. The present invention may also be applied not only to a cantilevered spindle motor but also to a spindle motor 1 of a structure, in the same manner, in which hub 6 is supported with closed sides by arranging ball bearings on the sides of a motor stator, which is arranged in the center of the shaft line direction of the fixed shaft.

Further, by securing an accurate bonding of rotor yoke 9 and drive magnet 11, the primer coating, in which a solvent containing metallic ions (e.g. copper ions) are applied onto the surfaces of electrolessly nickel plated layer 52 on drive magnet 11 and of electrolytically nickel plated layer 51 of rotor yoke 9, may be eliminated.

As described above, in the spindle motor of the present invention, a metallic layer is formed on the bonding surfaces of both a rotor yoke and a drive magnet in advance, thus providing a metal-metal bonding. Therefore, an acrylic adhesive, which can be cured faster and even under normal temperature if it is left for the time being may be used besides epoxy resins, thus improving productivity of a spindle motor.

While the foregoing description and drawings represent the preferred embodiments of the present invention, it will be obvious to those skilled in the art that various changes and modifications may be made therein without departing from the true spirit and scope of the present invention.

What is claimed is:

1. A spindle motor comprising:
   a rotor, which is rotatably supported by a stator;
   a rotor yoke, which is made up of a magnet fixed onto said rotor;
   a drive magnet, which is made of a bonded magnet which is adhesively fixed onto said rotor yoke by an acrylic adhesive;
   a first metallic layer formed onto a surface on said rotor yoke facing said drive magnet; and
   a second metallic layer formed on at least two surfaces of said drive magnet facing said rotor yoke and the stator;
   said first and said second metallic layers being made of nickel layers.

2. The spindle motor as set forth in claim 1 wherein said rotor is loaded with a data storage disk.

3. The spindle motor as set forth in claim 1 wherein said acrylic adhesive is anaerobic.

4. A spindle motor comprising:
   a rotor, which is rotatably supported by a stator;
   a rotor yoke, which is made up of a magnet fixed onto said rotor;
   a drive magnet, which is made of a bonded magnet which is adhesively fixed onto said rotor yoke;
   a first metallic layer formed onto a surface on said rotor yoke facing said drive magnet; and
   a second metallic layer formed on at least two surfaces of said drive magnet facing said rotor yoke and the stator;
   wherein surfaces of said first and said second metallic layers are primer coated.

5. A method for manufacturing a spindle motor having:
   a rotor, which is rotatably supported by a stator;
   a rotor yoke, which is made up of a magnet fixed onto said rotor;
   a drive magnet, which is made of a bonded magnet which is adhesively fixed onto said rotor yoke;
   a first metallic layer formed onto a surface facing said drive magnet on said rotor yoke; and
   a second metallic layer formed on at least two surfaces facing said rotor yoke and the stator on said drive magnet,
   said manufacturing method for eliminating a limitation for the type of adhesive to be used for bonding said bonded magnet and said rotor yoke in the spindle motor and for increasing productivity comprising the following steps:
   forming said metallic layer on the surface facing said drive magnet on said rotor yoke;
   forming at least two metallic layers on the surface facing said rotor yoke and the stator on said drive magnet; and
   attaching said drive magnet onto said rotor yoke after an acrylic adhesive is applied onto said metallic layers on both said rotor yoke and said drive magnet;
   wherein the metallic layer formed on a rotor case side and the metallic layer formed on a drive magnet side are formed with a same nickel layer.

6. The manufacturing method of a spindle motor as set forth in claim 5 wherein said manufacturing method comprises a step in which said spindle motor is assembled before said adhesive is completely cured.

7. The manufacturing method of a spindle motor as set forth in claim 5 wherein surfaces of said first and said second metallic layers are primer coated.

8. A method for manufacturing a spindle motor having:
   a rotor, which is rotatably supported by a stator;
   a rotor yoke, which is made up of a magnet fixed onto said rotor;
   a drive magnet, which is made of a bonded magnet which is adhesively fixed onto said rotor yoke;
   a first metallic layer formed onto a surface facing said drive magnet on said rotor yoke; and
   a second metallic layer formed on at least two surfaces facing said rotor yoke and the stator on said drive magnet,
   said manufacturing method for eliminating a limitation for the type of adhesive to be used for bonding said bonded magnet and said rotor yoke in the spindle motor and for increasing productivity comprising the following steps:
   forming said metallic layer on the surface facing said drive magnet on said rotor yoke;
   forming at least two metallic layers on the surface facing said rotor yoke and the stator on said drive magnet; and
   attaching said drive magnet onto said rotor yoke after an adhesive is applied onto said metallic layers on both said rotor yoke and said drive magnet;
   wherein surfaces of said first and said second metallic layers are primer coated.

* * * * *